April 5, 1938. C. N. ANDERSON 2,112,901
FISH LURE
Filed July 11, 1936
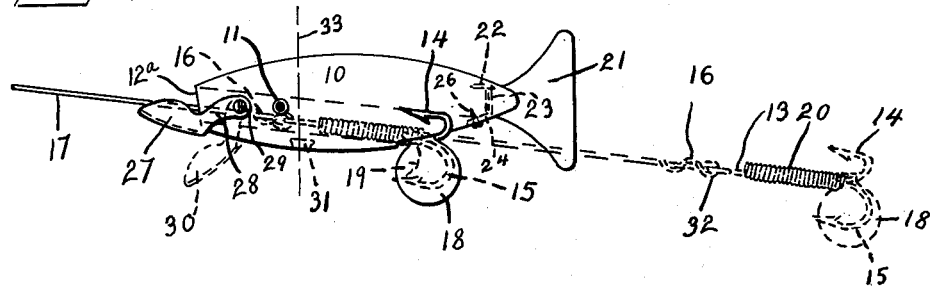
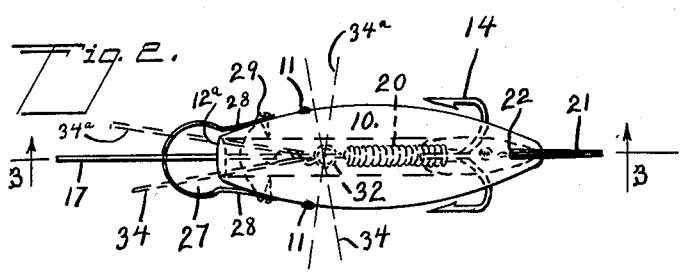
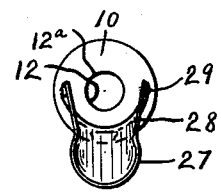
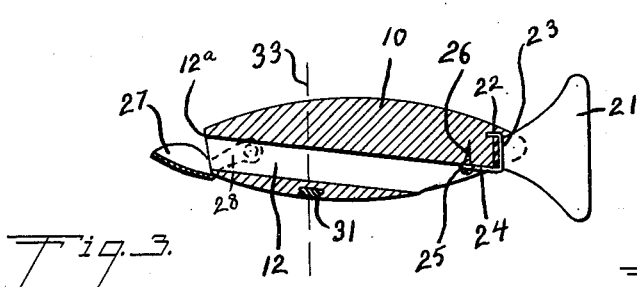
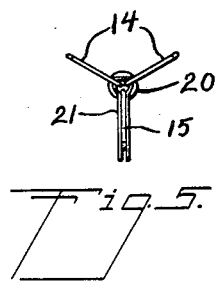
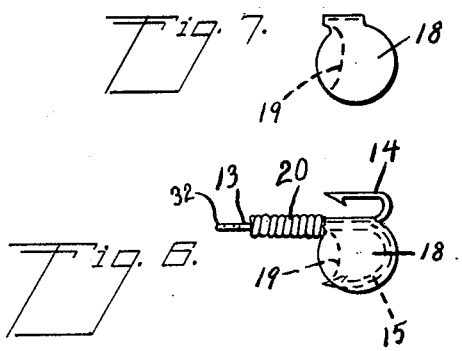
INVENTOR.
CHARLES N. ANDERSON.
BY John C. Baisch
ATTORNEY.

Patented Apr. 5, 1938

2,112,901

UNITED STATES PATENT OFFICE 2,112,901

FISH LURE

Charles N. Anderson, Grand Island, Nebr.

Application July 11, 1936, Serial No. 90,089

5 Claims. (Cl. 43—46)

This invention relates to fish lures and particularly to lures that simulate a small fish in appearance and action. Many types of such lures have been devised, but they lack the necessary action for more successful results. An important object of my invention is to provide a fish lure of attractive appearance that simulates a small fish in appearance.

Another object of my invention is to provide a lure of that character that is extremely active in operation and that will change its course every few inches of travel as it is drawn through the water.

Another object is to provide a device of this character that will swing or partly roll in the water as it darts back and forth.

Another object of the invention is to provide a device of this character wherein the hooks are substantially concealed or camouflaged.

Another object of the invention is to provide a device of this character wherein the body thereof becomes separated from the hooks as soon as the fish is caught, thereby leaving substantially no weight connected with the hook.

Another object of the invention is to provide a device of this character that may be used either on the surface or submerged.

Another object of the invention is to provide for a device of this character having means associated with the hook to prevent the hook from readily becoming detached from the fish's mouth.

Another object of the invention is to provide a device of this character that is simple in construction and relatively inexpensive to manufacture.

Other objects, advantages, and details of construction of the invention will be made more apparent as the description proceeds especially when considered in connection with the accompanying drawing wherein:

Figure 1 is an elevational view of my invention showing the hook in operative position and also showing the hook in dotted lines separated from the body.

Figure 2 is a plan view of my invention.

Figure 3 is a vertical section through the invention taken on line 3—3 of Figure 2.

Figure 4 is a front end view of the device.

Figure 5 is a rear end view of the hook.

Figure 6 is a side elevation of same.

Figure 7 is also a side elevation of the hook and anal fin showing where the two sheets of said anal fin are marginally cemented together along the forward or leading edge.

Referring more particularly to the drawing which illustrates a preferred embodiment of the invention, reference numeral 10 indicates the body of the lure generally. The body may be suitably colored and provided with eyes 11. The body is provided with an opening 12 extending from the forward end thereof diagonally downwardly and rearwardly. The opening 12 is adapted to receive the shank 13 of a three-pronged or treble hook 14 nesting against the respective sides of the body and hook 15 depending downwardly therefrom when the shank 13 is received in opening 12.

A swivel joint 16 is transposed between the shank 13 and the fish line 17. An anal fin is provided on hook 15 and comprises two sheets 18 of thin flexible rubber. The sheets are disposed on either side of hook 15 and are folded over and secured to the shank 13. Said sheets are marginally cemented together at 19 as shown in Figure 7. In my preferred embodiment the shank is weighted at 20 by winding a piece of lead wire thereon. A caudal fin 21 is provided at the rear end of the body and comprises two pieces of soft flexible rubber folded at 22 and received in a vertical slot provided therefor. A U-shaped fastener 23 preferably of wire is received between the two pieces of rubber and is provided with an extension 24 which terminates in an eye 25. A screw 26 is received in the eye 25 and screwed into the body 10. A pectoral fin 27 is provided at the forward end of the body, the forward side of said fin is concave or shovel-shaped and is provided with rearwardly extending arms 28 between which is received the forward end of the body. The concave shape of the pectoral fin 27 aids in effecting a rolling or rocking action of the body as same is drawn through the water. The arms 28 have openings adjacent their rear ends in which are received screws 29 screwed into the body 10. The pectoral fin is adapted to swing on said screws 29 and may be moved downwardly and rearwardly into the position shown in dotted lines 30 in Figure 1. A weight 31 is embedded in the under side of the body in substantially vertical alignment with the eye 32 at the forward end of the shank 13 of the hook. The weight 31 is preferably round as respects its vertical axis about which the body swings when the device is being drawn through the water. The weight 31 tends to keep the body of the plug at an even keel although it is not heavy enough to prevent the normal rolling or rocking thereof as same is drawn through the water.

In the preferred embodiment of my invention as shown in the accompanying drawing, the body of the device will float when the hook is not secured therein. For submerged use, the weight 20 of the hook is sufficient to cause the device to sink a suitable distance below the surface. After a cast, the line is reeled in and the device drawn through the water. As it is thus drawn through the water, it will dart back and forth every few inches simulating the swimming action of a fish.

The pectoral fin 27 aids in maintaining the device at a suitable level beneath the surface. The pectoral fin 27 when in the downward position protects the hook against entanglement with snags as well as aids in maintaining the device at a suitable level beneath the surface of the water, causing the device to roll or rock in operation. After a strike, particularly from the side, the pectoral fin 27 folds forwardly where it is out of the way. The mouth of the fish contacts the pectoral fin 27 and as the fish closes its mouth on the lure the closing of the jaws moves said fin 27 forwardly. The anal fin 18 serves as a stabilizing element as does the caudal fin 21. As the device with a hook in the position shown in Figures 1 and 2 is drawn through the water, the axis upon which it turns is a vertical line 33 through the weight 31 and eye 32 and shank 13. The forward end of opening 12 is sufficiently large to permit considerable swinging before the side edges 12a thereof strike the line as shown by dotted line 34 in Figure 2. As the device darts in one direction, it will continue in said direction until the respective side edge strikes the line which will tend to pull the body in the opposite direction until the opposite side edge 12a of the opening 12 strikes the line 34a. The body is then pulled back into the first mentioned course.

As the body darts back and forth it will also roll or rock due to the concave shape of the front surface of the pectoral fin.

When a fish has struck the lure and becomes hooked, the body will move forward on the line and due to its buoyancy will rise to the surface of the water. The fish has only the hook in its mouth and the weight of said hook is so slight that the fish has nothing to work on in its efforts to throw same from its mouth.

In lures having the hook permanently attached to the body, the weight of the body is added to that of the weight of the hook and a fish very often can throw the hook from its mouth because of the weight of the body.

The anal fin 18 being cemented at 19 has a tendency to hold the barb of the hook against the wall of the mouth of the fish after said hook has become engaged in said mouth. This function will be affected even where the hook has torn a slot in the wall of the mouth and will therefore insure landing fish in many cases where same would otherwise be lost.

The rolling and darting action of the device is the same whether on the surface or submerged. Due to the fact that the body portion of a fish lure is the expensive part thereof, it is unnecessary for the fisherman to purchase a large number of complete lures. One body of the type used in my invention will ordinarily suffice. Various sizes and types of hooks which are relatively inexpensive may be taken along on a fishing trip to get the variety of hooks, sizes, and types.

Even though a hook may become snagged beneath the surface of the water, the lure will not necessarily be lost for upon the breakage of the line the body portion will come to the surface and float and may be recovered.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a fish lure, in combination, an elongated rearwardly tapering body suitably colored and having a longitudinal opening therethrough extending from the forward end downwardly and rearwardly below the horizontal center of the body, a caudal fin of soft flexible waterproof material secured to the rear portion of the body, a pectoral fin hinged adjacent the forward end of the body and adapted to be moved from a downwardly and forwardly extending position to a forwardly extending position, the front face of said pectoral fin being concave, a treble hook having a weighted shank terminating in an eye, the shank being removably received in the rearward portion of the opening in the body, one of the hooks depending from the body, one of the other hooks resting against one side of the body and the other hook resting against the opposite side of the body, an anal fin secured to the shank of the hook, said anal fin comprising two sheets of soft flexible elastic water-proof material one sheet being on one side of the depending hook and the other sheet on the opposite side thereof, said sheets being marginally cemented together along the leading edge thereof, a disk-like weight embedded in the lower side of the body substantially beneath the eye of the hook shank when same is received in the body opening, said eye being in a substantially horizontal plane, and a line secured in the eye of the hook and extending out of the forward end of the opening in the body.

2. In a fish lure, in combination, a substantially cigar-shaped body having a large diameter longitudinal opening therethrough extending from the forward end downwardly and rearwardly below the horizontal center of the body, a caudal fin of soft flexible water-proof material secured to the rear portion of the body, a pectoral fin hinged adjacent the forward end of the body and adapted to be moved from a downwardly and forwardly extending position to a forwardly extending position, the front face of said pectoral fin being concave, a treble hook having a weighted shank terminating in an eye, the shank being removably received in the rear portion of the opening in the body, one of the hooks depending from the body, one of the other hooks resting against one side of the body and the other hook resting against the opposite side of the body, a depending anal fin secured to the shank of the hook and adapted to conceal the depending hook, a disk-like weight embedded in the under side of the body substantially beneath the eye of the hook shank when same is positioned in the body opening, and a line secured in the eye of the hook and extending forwardly outward from the opening in the body.

3. In a fish lure, in combination, a substantially cigar-shaped body having a large longitudinal hole therethrough extending from the forward end downwardly and rearwardly and opening adjacent the rear and below the horizontal center of the body, a caudal fin of soft flexible water-proof material secured to the rear portion of the body, a pectoral fin hinged adjacent the forward end of the body and adapted to be moved from a downwardly and forwardly extending position to a forwardly extending position, a hook having a weighted shank terminating at its forward end in an eye, said shank being removably received in the rear portion of the body opening, said hook depending from the body when the shank is received in said opening, a soft flexible anal fin secured to the hook and adapted to conceal same, a weight in the under side of the body beneath the eye of the hook, and means extending into the longitudinal opening in the body from the forward end thereof and secured to the eye of the hook.

4. In a fish lure, in combination, an elongated body tapering toward the ends and having a longitudinal hole therethrough extending from the forward end downwardly and rearwardly, the rear opening of said hole being in the under side of the body, a soft flexible caudal fin at the rear end of the body, a pectoral fin adjacent the forward end of the body adapted to draw the front end of the body downwardly when the device is pulled through the water and to cause said device to rock on its longitudinal axis, a hook having a shank terminating at its forward end in an eye, said shank being removably received in the rear portion of the opening in the body, said hook depending from the body when the shank is received in the body opening, a soft flexible anal fin secured to the hook and adapted to conceal same, a weight secured to the under side of the body beneath the eye of the hook shank, and a line secured to the eye and extending forwardly through the opening in the body, said opening being of sufficient size to permit limited horizontal swinging movement of the body.

5. In a fish lure, in combination, an elongated body tapering toward the ends and having a longitudinal opening therethrough extending from the forward end to the under side thereof adjacent the rear end, a flexible caudal fin at the rear end of the body, a pectoral fin adjacent the forward end of the body and adapted to draw the front end of the body downwardly when the device is moved through the water and to cause same to rock on its longitudinal axis, a depending hook having its shank removably received in the rear portion of the longitudinal opening, a weight secured to the body beneath the forward end of the shank, and means attached to the forward end of the shank for drawing the lure through the water, said means extending through the opening forwardly of the body.

CHARLES N. ANDERSON.